US012779637B2

(12) United States Patent
Chen

(10) Patent No.: US 12,779,637 B2
(45) Date of Patent: Nov. 3, 2026

(54) ROTATABLE HAND TOOL

(71) Applicant: GONG FONG ENTERPRISE CO., LTD., Tainan City (TW)

(72) Inventor: Hsin-Kae Chen, Tainan City (TW)

(73) Assignee: Gong Fong Enterprise Co., Ltd., Tainan City (TW)

( * ) Notice: Subject to any disclaimer, the term of this patent is extended or adjusted under 35 U.S.C. 154(b) by 408 days.

(21) Appl. No.: 18/488,396

(22) Filed: Oct. 17, 2023

(65) Prior Publication Data

US 2025/0121479 A1 Apr. 17, 2025

(51) Int. Cl.
*B25B 23/00* (2006.01)
*B25B 15/04* (2006.01)

(52) U.S. Cl.
CPC .......... *B25B 23/0028* (2013.01); *B25B 15/04* (2013.01); *B25B 23/0035* (2013.01)

(58) Field of Classification Search
CPC .. B25B 15/04; B25B 23/0028; B25B 23/0035
USPC ................... 81/60, 63.1, 177.8, 177.9, 177.7
See application file for complete search history.

(56) References Cited

U.S. PATENT DOCUMENTS

| | | | | |
|---|---|---|---|---|
| 4,170,909 A * | 10/1979 | Wagner | B25G 1/085 D8/107 |
| 4,929,113 A * | 5/1990 | Sheu | F16C 11/045 403/324 |
| 5,060,894 A * | 10/1991 | Hillinger | F16M 11/16 403/166 |
| 6,966,239 B2 * | 11/2005 | Lai | B25B 23/0035 81/57.39 |
| 8,898,862 B1 * | 12/2014 | McGrath | E05D 11/1007 16/334 |
| 10,525,571 B2 * | 1/2020 | Hu | B25B 15/04 |
| 11,541,527 B2 * | 1/2023 | Kao | B25B 15/02 |
| 12,370,655 B2 * | 7/2025 | Peng | B25B 13/463 |

* cited by examiner

*Primary Examiner* — Hadi Shakeri
(74) *Attorney, Agent, or Firm* — Rosenberg, Klein & Lee

(57) ABSTRACT

A rotatable hand tool includes a grip, a tool head, and a pivoting unit. The grip has a first pivot portion. The first pivot portion has a recess and a first tooth groove. The tool head has a second pivot portion. The second pivot portion has a through hole and a second tooth groove. The pivoting unit includes an elastic member, a positioning gear, and a button assembly. The elastic member is placed into the recess. The positioning gear is engaged with the first tooth groove and the second tooth groove, so that the tool head is retained at an initial angle. The button assembly is inserted in the through hole. The button assembly can be pressed to push against the positioning gear to disengage from the second tooth groove and compress the elastic member. At this time the tool head can be operated to pivot to a working angle.

11 Claims, 16 Drawing Sheets

ROTATABLE HAND TOOL

FIELD OF THE INVENTION

The present invention relates to a rotatable hand tool, and more particularly to a rotatable hand tool having a tool head that can be pivoted to different working angles relative to a grip.

BACKGROUND OF THE INVENTION

A conventional hand tool usually has a grip extending axially and a tool head extending axially and coupled to the grip, such as a screwdriver.

However, when the distance between adjacent objects is very narrow, for example, when a screwdriver is used to lock a screw and the screwdriver cannot reach the distance between the adjacent objects to work, it is necessary to remove the adjacent objects, resulting in inconvenience to work.

As disclosed in Taiwan Utility Model Publication No. M643007 titled "UNIVERSAL SCREWDRIVER STRUCTURE", a universal connector is connected between a grip and a driver bit, so that the driver bit can change the working angle relative to the grip, thus making it possible to carry out operations at positions and angles that are difficult to reach.

However, in the above-mentioned patent, there is no retaining mechanism for retaining the angle of the universal connector. When the working angle of the driver bit relative to the grip is changed, the working angle cannot be retained, making the operation inconvenient.

As disclosed in Taiwan Utility Model Publication No. M538867 titled "INSULATED MULTI-ANGLE RATCHET DRIVER", a drive head is pivotally connected to a grip, so that the drive head can change the working angle relative to the grip. The drive head is provided with a gear. When the drive head is pivoted to a different working angle relative to the grip, the drive head can be retained at the different working angle by pressing a button to be engaged in the space between adjacent teeth at different angles on the gear. The working angle of the drive head can be readjusted by pressing the button again to move the button away from the space between adjacent teeth.

In the above-mentioned patent, although the drive head can be retained at the working angle when the drive head is pivoted to the working angle relative to the grip, the drive head is only engaged in the pivoting direction by pressing the button. The drive head and the grip are not engaged with each other in the pivoting direction. Besides, the retaining effect is poor because only the button is engaged in the space between adjacent teeth at the working angle.

SUMMARY OF THE INVENTION

The primary object of the present invention is to provide a rotatable hand tool, comprising a grip, a tool head, and a pivoting unit. The grip extends in an axial direction. One end of the grip has a first pivot portion. The first pivot portion has a recess and a first tooth groove. The recess extends in a radial direction perpendicular to the axial direction. The first tooth groove communicates with the recess. The tool head has a tool part at one end thereof in the axial direction and a second pivot portion at another end thereof. The second pivot portion has a through hole in the radial direction and a second tooth groove communicating with the through hole. The pivoting unit connects the first pivot portion of the grip and the second pivot portion of the tool head, so that the tool head is pivotally connected to the grip. The pivoting unit includes an elastic member, a positioning gear, and a button assembly. The elastic member is placed into the recess. The positioning gear leans against the elastic member and is engaged with the first tooth groove and the second tooth groove, so that the tool head is retained at an initial angle relative to the grip. The button assembly is inserted in the through hole and corresponds to the positioning gear. The button assembly is movable in the radial direction when being pressed.

When the button assembly is pressed, the button assembly pushes against the positioning gear for controlling the positioning gear to disengage from the second tooth groove and compress the elastic member, such that the tool head can be operated to pivot to a working angle relative to the grip. After that, the button assembly is released to return the elastic member and control the positioning gear to be engaged with the second tooth groove again, so that the tool head is retained at the working angle relative to the grip.

Preferably, the button assembly includes a retaining base, a retaining pin, and a button. The retaining base has a perforation. The button has a pressing piece facing the perforation. The grip has a retaining portion. The retaining portion has a retaining hole. The retaining base passes through the retaining hole and is inserted in the through hole to lean against the positioning gear. The retaining pin passes through the retaining base to lock the retaining base on the grip. The button is disposed on the retaining base. The pressing piece passes through the perforation to push against the positioning gear.

Preferably, the tool part of the tool head includes a connector and a replaceable driver bit. The replaceable driver bit is detachably connected to the connector.

Preferably, the connector has a receiving groove, a U-shaped elastic plate, and a magnetic member. Two opposite side walls of the receiving groove have a pair of coupling holes. The U-shaped elastic plate includes two elastic legs each having a curved protruding portion. The U-shaped elastic plate is inserted into the receiving groove, and the arc-shaped protruding portions of the two elastic legs extend out of the coupling holes. The magnetic member is placed in the receiving groove. The replaceable driver bit includes a driver and a socket. The driver is inserted in the receiving groove and attracted and secured by the magnetic member. The socket is sleeved on the connector and elastically secured by the curved protruding portions of the two elastic legs of the U-shaped elastic plate.

Preferably, the tool part of the tool head includes a ratchet body seat, a ratchet elastic plate, two detents, a pinion, a positioning elastic plate, and a ratchet direction adjustment member. The ratchet body seat has an accommodating space. A first restricting portion, a second restricting portion and two spaced blocking portions are provided on an inner wall of the accommodating space. The ratchet elastic plate is disposed on the first restricting portion of the accommodating space. The ratchet elastic plate has two holding portions corresponding to the two blocking portions. The two detents are disposed in the accommodating space. One side of each detent is blocked by a corresponding one of the blocking portions, and another side of each detent is held by a corresponding one of the holding portions of the ratchet elastic plate, so that each detent is positioned between the corresponding blocking portion and the corresponding holding portion. One end of the pinion is connected to the connector. Another end of the pinion is inserted into the accommodating space. A first toothed portion of the pinion is located between the two detents. The first toothed portion is detachably engaged with a second toothed portion of each detent. The positioning elastic plate is disposed on the second restricting portion of the accommodating space. The positioning elastic plate has an operating portion. The ratchet direction adjustment member has two contact portions corresponding to the respective detents. The ratchet direction adjustment member has an operated portion corresponding to the operating portion of the positioning elastic plate. The operating portion is configured to operate the operated portion for one of the contact portions to push against a corresponding one of the detents, so that the second toothed portion of the corresponding detent is disengaged from the first toothed portion of the pinion.

Preferably, the first restricting portion includes a first concave space and two engaging blocks adjacent to two side walls of the first concave space. The ratchet elastic plate has two engaging grooves corresponding to the two engaging blocks, thereby retaining the ratchet elastic plate on the first restricting portion.

Preferably, the second restricting portion includes a second concave space and two blocking walls adjacent to the second concave space. The positioning elastic plate is placed in the second concave space. Two ends of the positioning elastic plate are held by the two blocking walls.

Preferably, the operating portion of the positioning elastic plate is in the form of a protrusion, and the operated portion of the ratchet direction adjustment member is in the form of three notches that are arranged side by side.

Preferably, a rotary cap is provided to cover the ratchet body seat. The pinion passes through the rotary cap. The ratchet direction adjustment member is coupled to the rotary cap.

Preferably, another end of the grip is recessed to form an accommodating groove. A driver bit storage unit is accommodated in the accommodating groove. The driver bit storage unit includes a slide rod and a storage rod. The slide rod is secured in the accommodating groove. The storage rod has a plurality of grooves formed on a peripheral wall thereof. A plurality of replaceable driver bits are respectively received in the grooves. The storage rod is sleeved on the slide rod and is slidable along the slide rod, thereby allowing the storage rod to slide into or out of the accommodating groove.

Preferably, the slide rod has an annular first restricting groove and an annular second restricting groove on two opposite ends thereof. The first restricting groove is adjacent to an inner edge of the accommodating groove. The second restricting groove is adjacent to an opening of the accommodating groove. The first restricting groove has a first slope extending obliquely from a bottom of the first restricting groove toward the second restricting groove. The second restricting groove has a second slope extending obliquely from a bottom of the second restricting groove toward the first restricting groove. The storage rod has an arc-shaped slot. A fastener is inserted in the arc-shaped slot from an outside of the storage rod. When the storage rod slides on the slide rod into or out of the accommodating groove, the fastener is selectively restricted in the first restricting groove or in the second restricting groove.

According to the above technical features, the present invention can achieve the following effects:

1. When the distance between adjacent objects is insufficient, the button assembly is pressed for the positioning gear to disengage from the second tooth groove, so that the tool head can be pivoted to a desired working angle relative to the grip. When the button assembly is released, the positioning gear is elastically returned to be engaged with the second tooth groove again, so that the tool head is retained at the working angle relative to the grip. The operation is more convenient. The positioning gear is able to secure the tool head circumferentially, so that the tool head can be retained at the working angle stably.
2. The positioning gear is engaged with the first tooth groove of the grip and the second tooth groove of the tool head simultaneously, so the grip and the tool head are simultaneously locked in the pivoting direction. The retaining effect is better.
3. In the present invention, the tool part of the tool head has a ratchet structure, so that the working direction of the tool part can be controlled.
4. The other end of the grip is recessed to form the accommodating groove. The driver bit storage unit has the storage rod to store replaceable driver bits. The storage rod is slidable along the slide rod, so that the storage rod can slide into or out of the accommodating groove, which can facilitate the storage and replacement of the replaceable driver bits.

DETAILED DESCRIPTION OF THE PREFERRED EMBODIMENTS

Embodiments of the present invention will now be described, by way of example only, with reference to the accompanying drawings.

Figure 1:
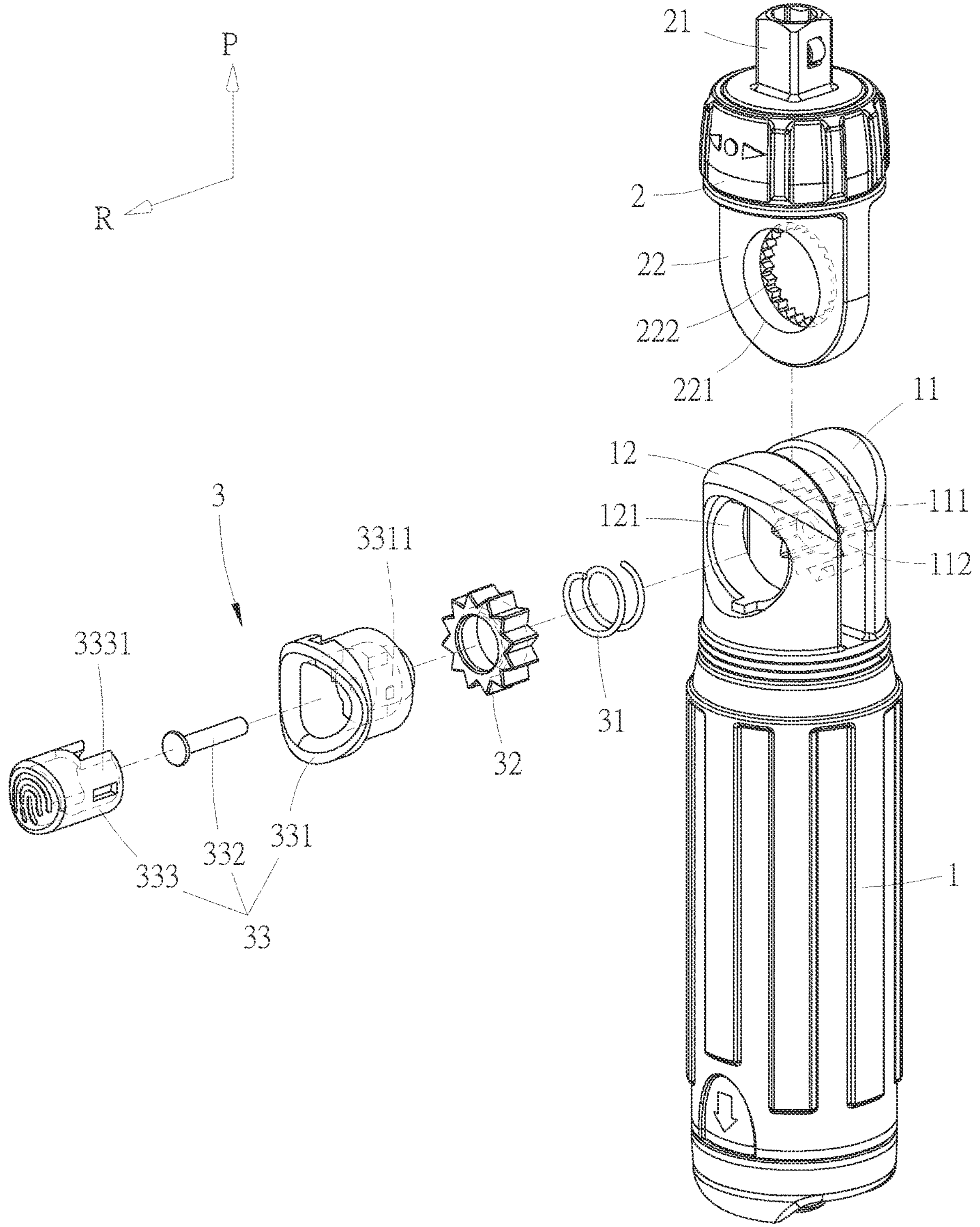
FIG. 1 is an exploded view of the present invention, wherein the tool head is pivotable relative to the grip.
Figure 2:
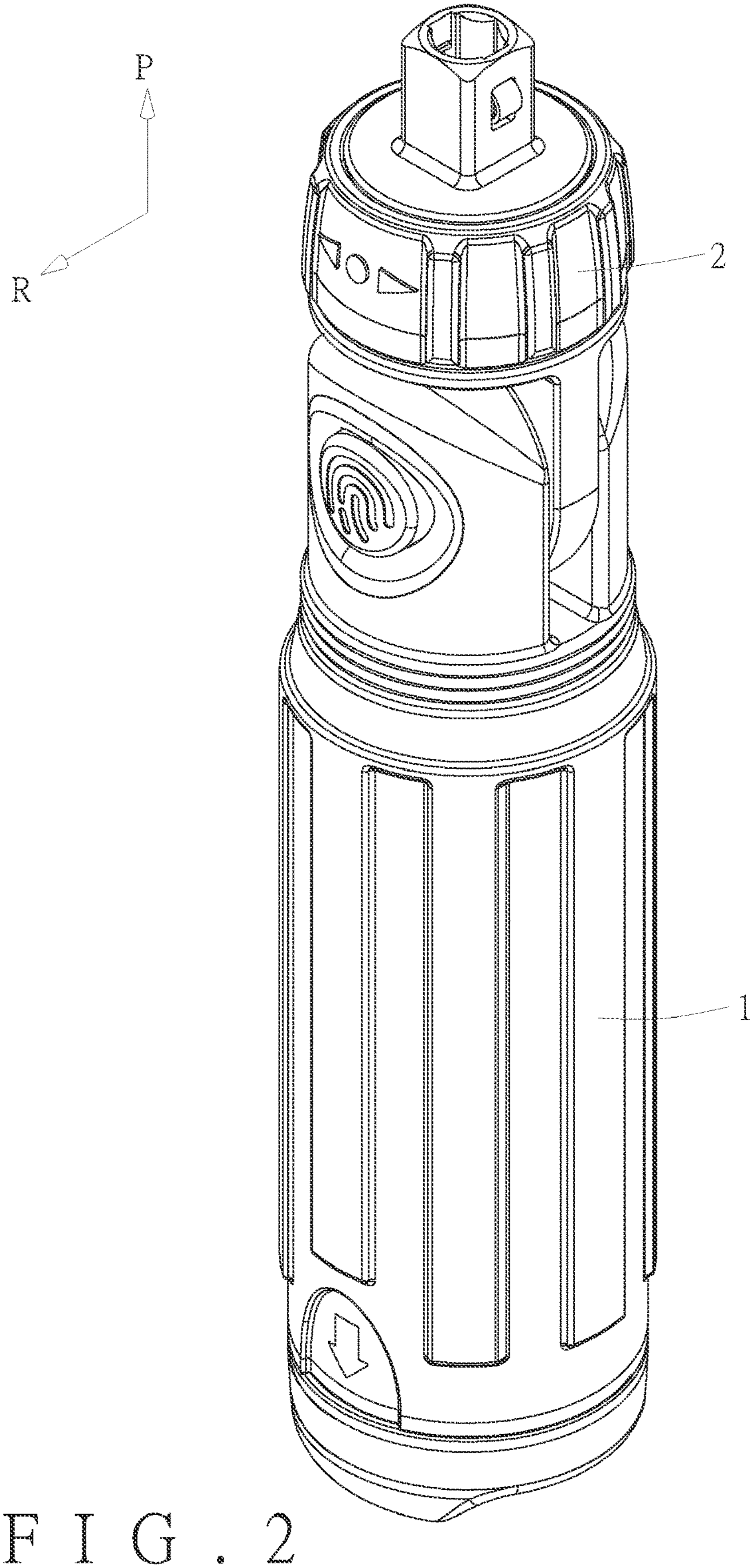
FIG. 2 is a perspective view of the present invention, wherein the tool head is pivotable relative to the grip.
Figure 3:
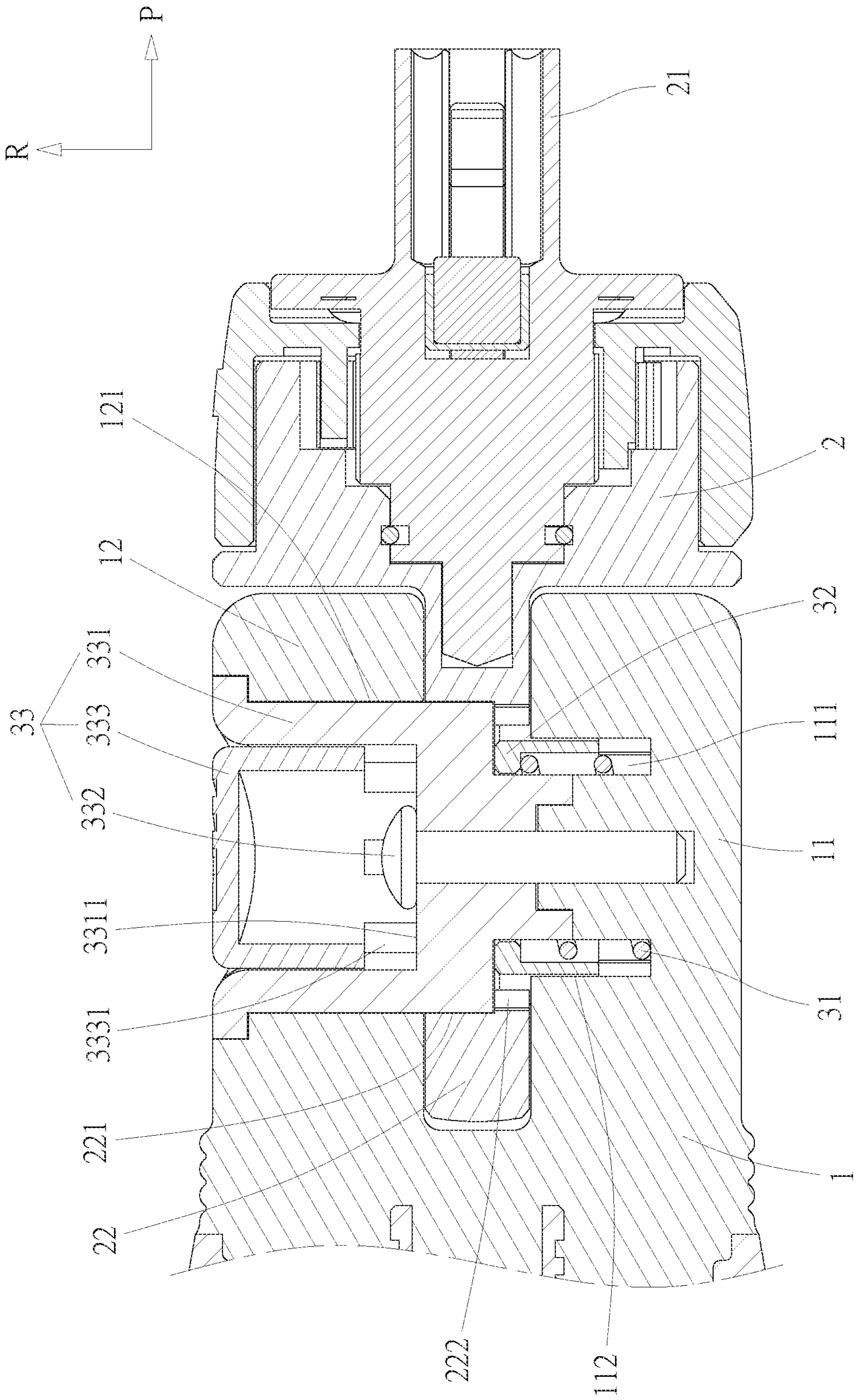
FIG. 3 is a cross-sectional view of FIG. 2.

As shown in FIG. 1, FIG. 2 and FIG. 3, the present invention discloses a rotatable hand tool, comprising a grip 1, a tool head 2, and a pivoting unit 3.

The grip 1 extends in an axial direction P. One end of the grip 1 has a first pivot portion 11. The first pivot portion 11 has a recess 111 and a first tooth groove 112. The recess 111 extends in a radial direction R perpendicular to the axial direction P. The first tooth groove 112 communicates with the recess 111. The tool head 2 has a tool part 21 at one end in the axial direction P and a second pivot portion 22 at the other end. The second pivot portion 22 has a through hole 221 in the radial direction R and a second tooth groove 222 communicating with the through hole 221. The pivoting unit 3 connects the first pivot portion 11 of the grip 1 and the second pivot portion 22 of the tool head 2 so that the tool head 2 is pivotally connected to the grip 1. The pivoting unit 3 includes an elastic member 31, a positioning gear 32, and a button assembly 33. The clastic member 31 is placed into the recess 111. The positioning gear 32 leans against the clastic member 31 and is engaged with the first tooth groove 112 and the second tooth groove 222, so that the tool head 2 is retained at an initial angle relative to the grip 1. The initial angle is, for example, zero degrees extending in the axial direction P. The button assembly 33 is inserted in the through hole 221 and corresponds to the positioning gear 32. The button assembly 33 can be pressed and displaced in the radial direction R. In this embodiment, the button assembly 33 includes a retaining base 331, a retaining pin 332, and a button 333. The retaining base 331 has a perforation 3311. The button 333 has a pressing piece 3331 facing the perforation 3311. The grip 1 has a retaining portion 12. The retaining portion 12 has a retaining hole 121. The retaining base 331 passes through the retaining hole 121 and is inserted in the through hole 221 to lean against the positioning gear 32. The retaining pin 332 passes through the retaining base 331 to lock the retaining base 331 on the grip 1. The button 333 is disposed on the retaining base 331, and the pressing piece 3331 passes through the perforation 3311 to push against the positioning gear 32.

Figure 4:
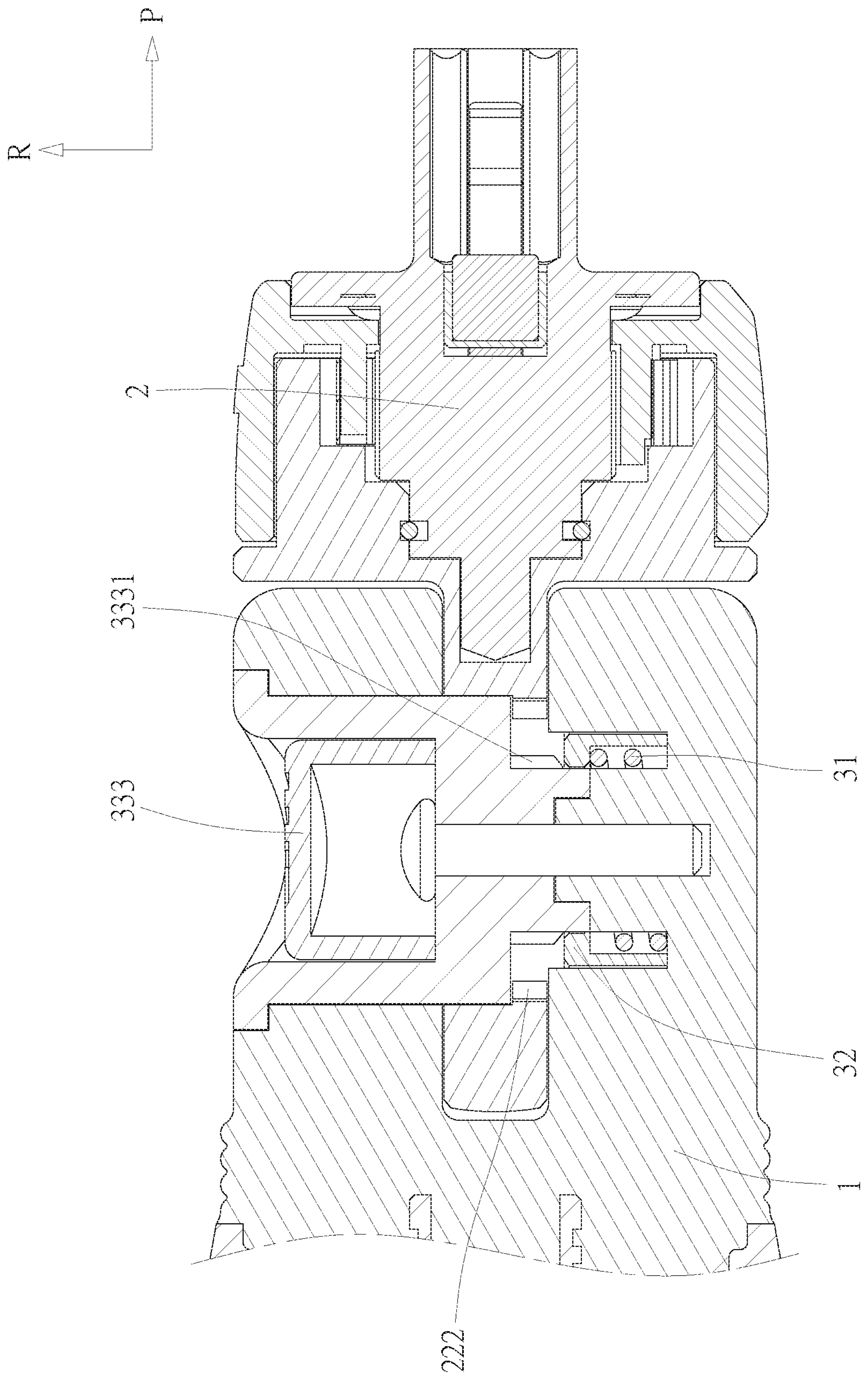
FIG. 4 is a schematic view of the present invention, illustrating the operation that the tool head is pivoted relative to the grip.
Figure 5:
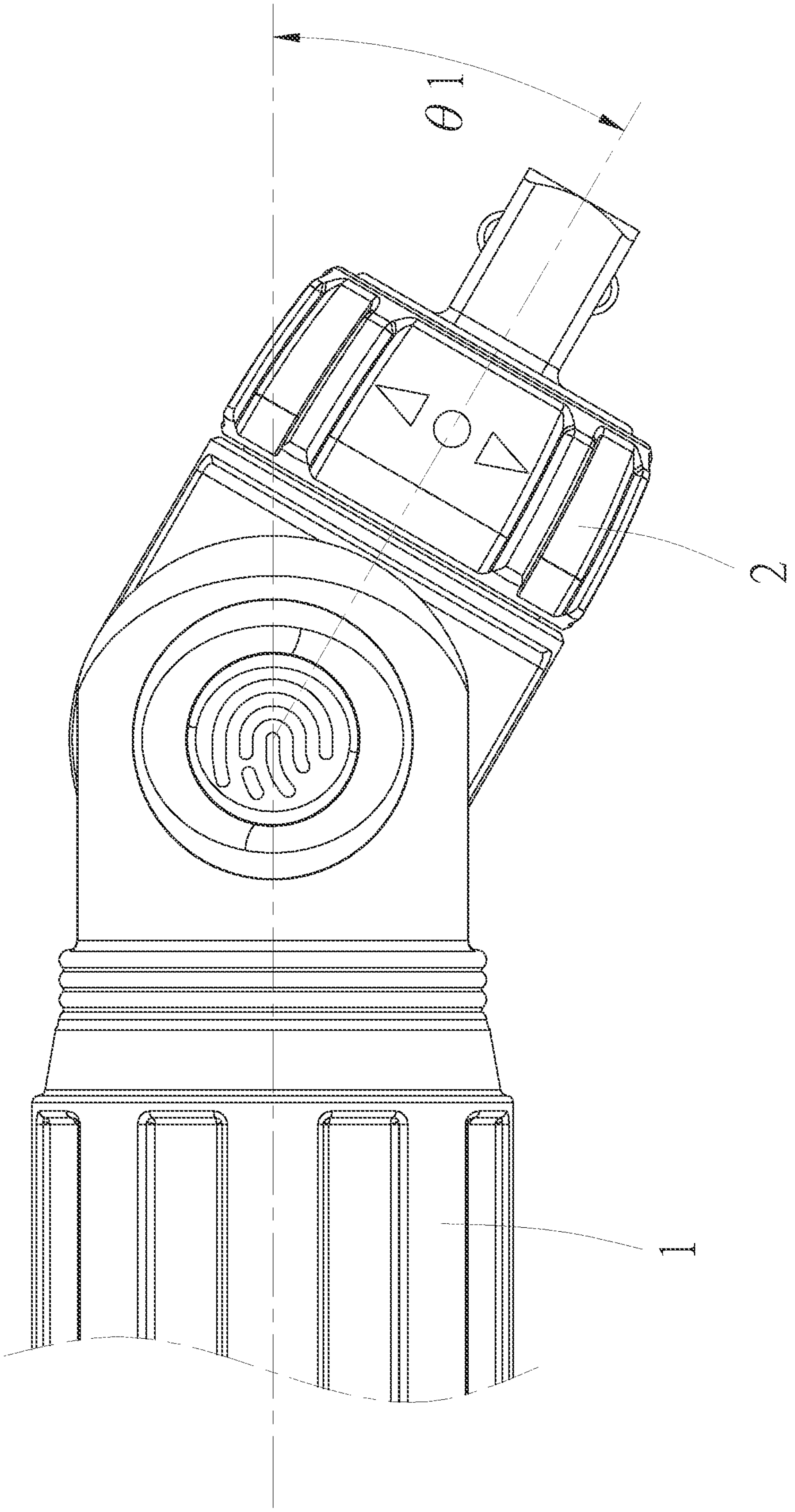
FIG. 5 is a schematic view of the present invention, wherein the tool head is pivoted to a first working angle relative to the grip.
Figure 6:
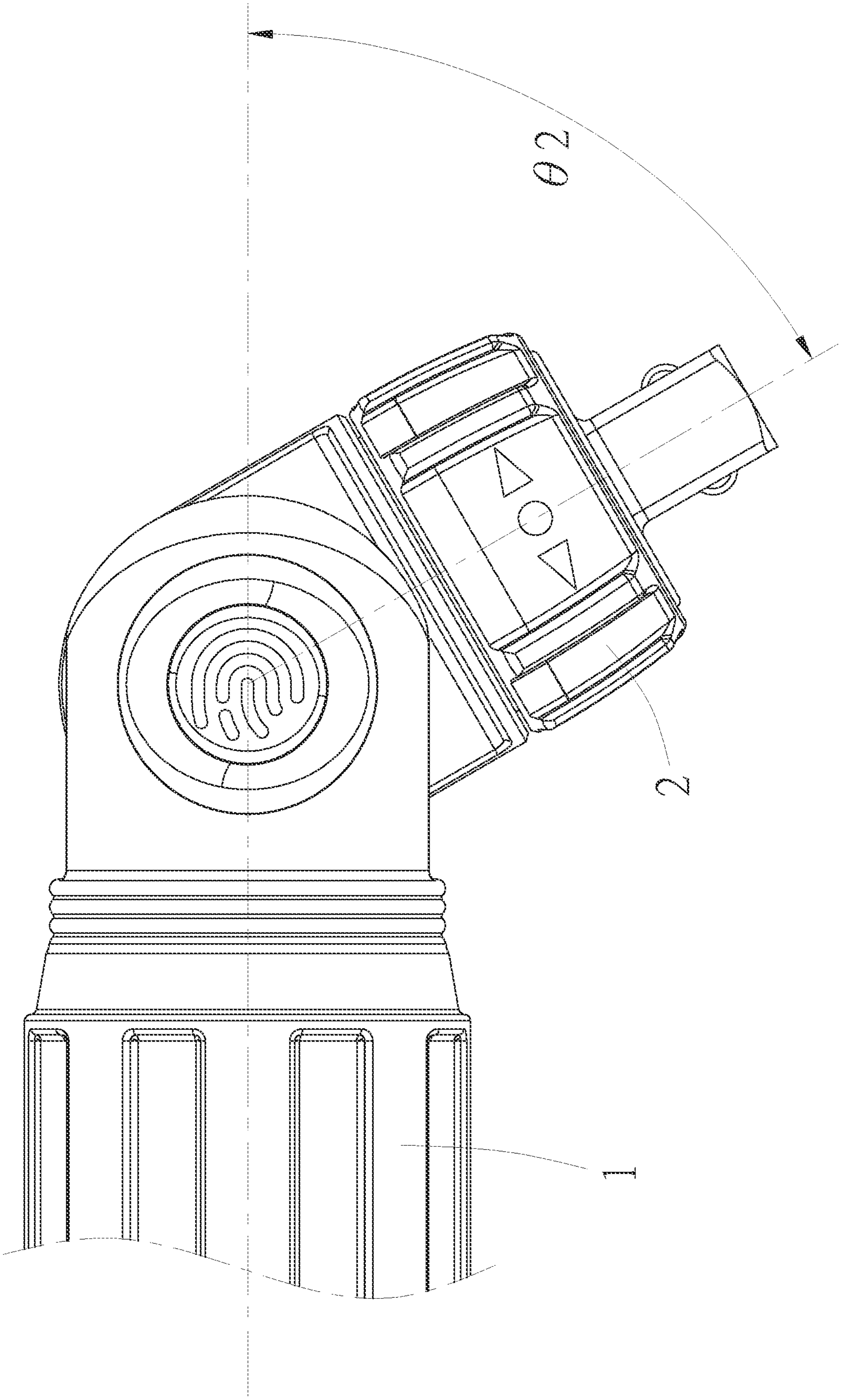
FIG. 6 is a schematic view of the present invention, wherein the tool head is pivoted to a second working angle relative to the grip.

Referring to FIG. 4 through FIG. 6, when the distance between adjacent objects is insufficient and it is necessary to change the working angle of the tool head 2 relative to the grip 1, the user can press the button 333 so that the pressing piece 3331 of the button 333 pushes against the positioning gear 32 for controlling the positioning gear 32 to disengage from the second tooth groove 222 and compress the clastic member 31. At this time, the tool head 2 can be operated to pivot to a working angle relative to the grip 1, such as a first working angle θ1 shown in FIG. 5 or a second working angle θ2 shown in FIG. 6. After that, the button 333 is released to return the elastic member 31 and control the positioning gear 32 to be engaged with the second tooth groove 222 again, so that the tool head 2 is retained at the working angle relative to the grip 1.

Figure 7:
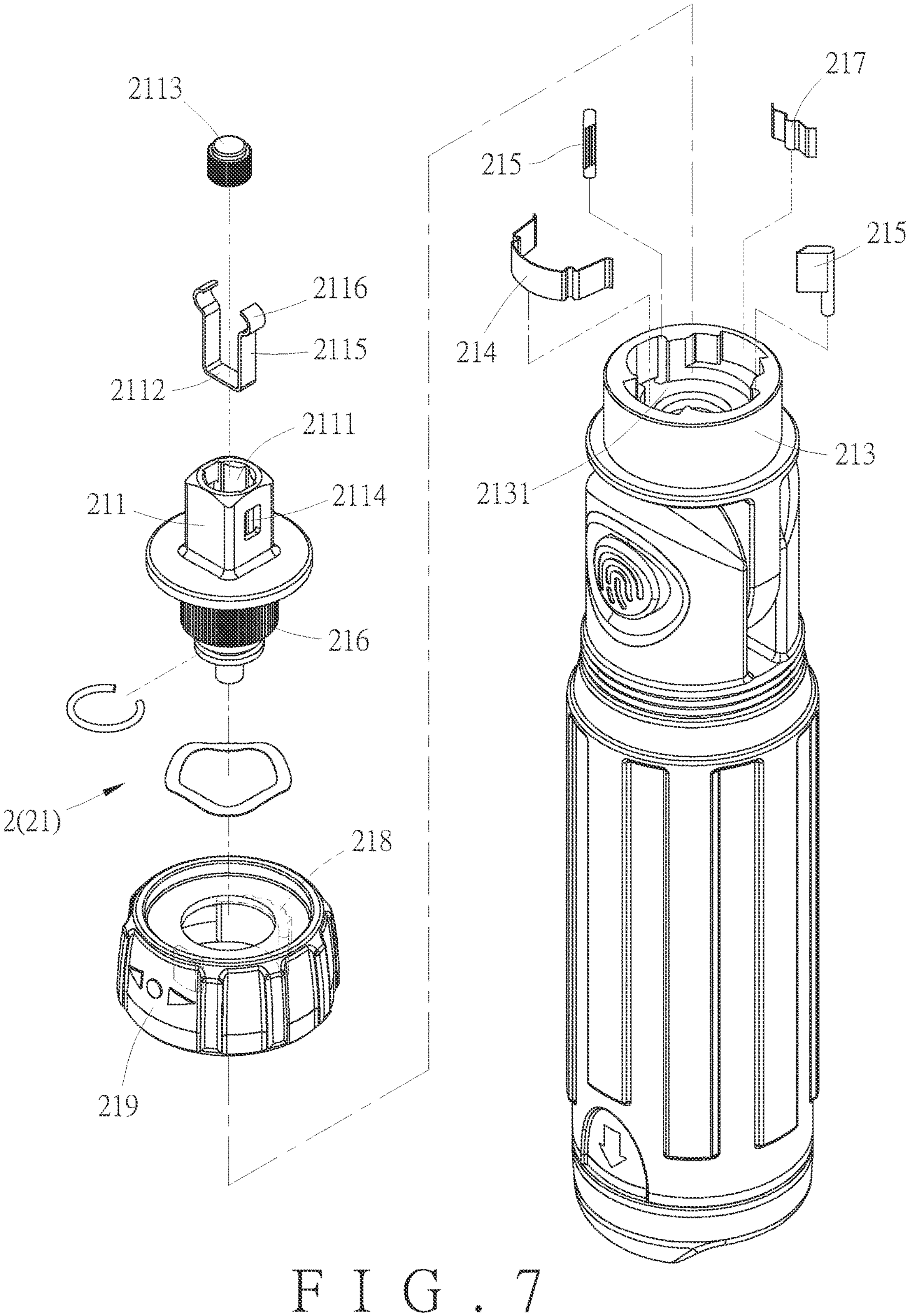
FIG. 7 is an exploded view of the tool part of the tool head of the present invention.
Figure 8:
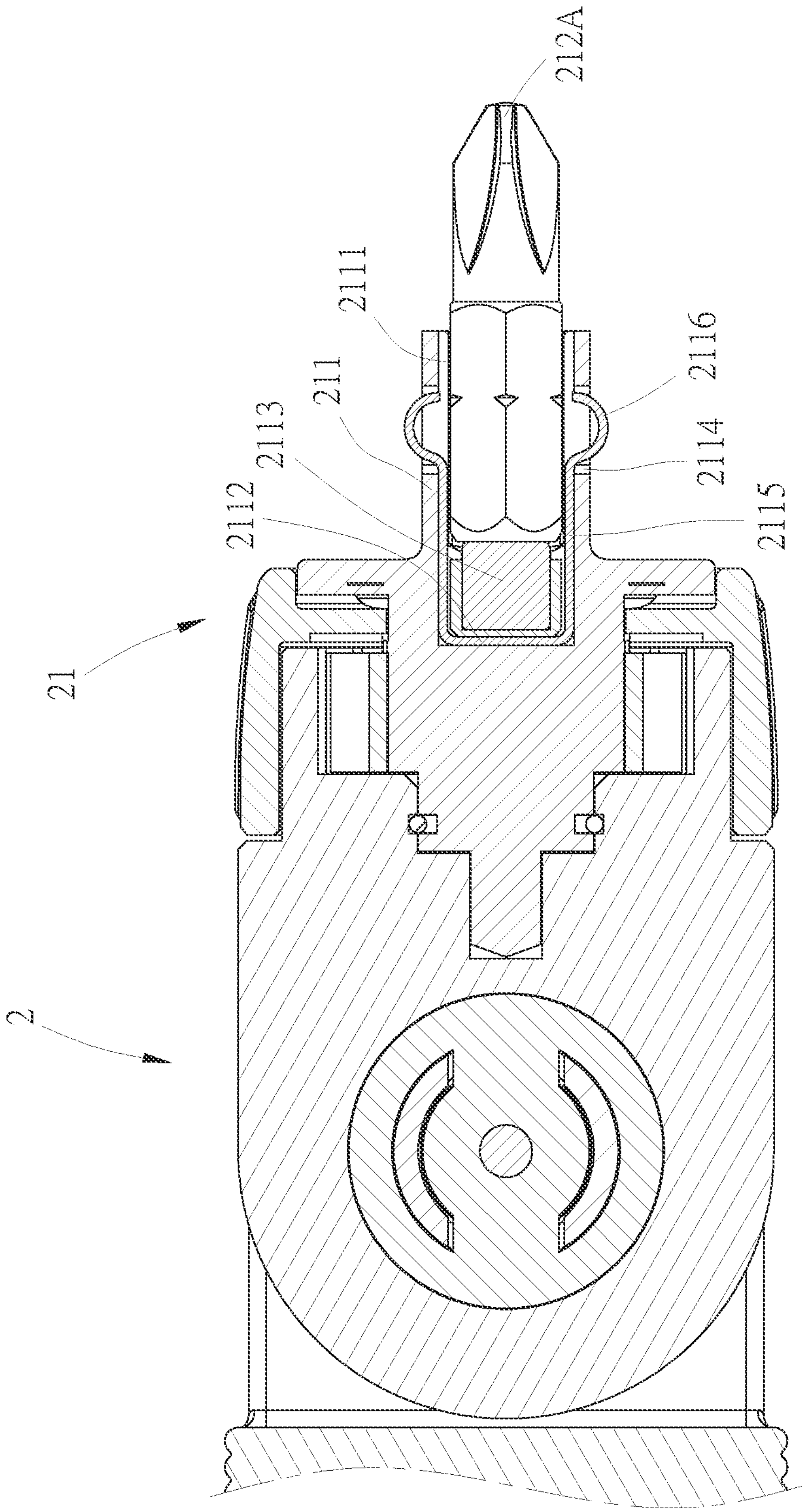
FIG. 8 is a cross-sectional view of the tool part equipped with a driver of the tool head of the present invention.
Figure 9:
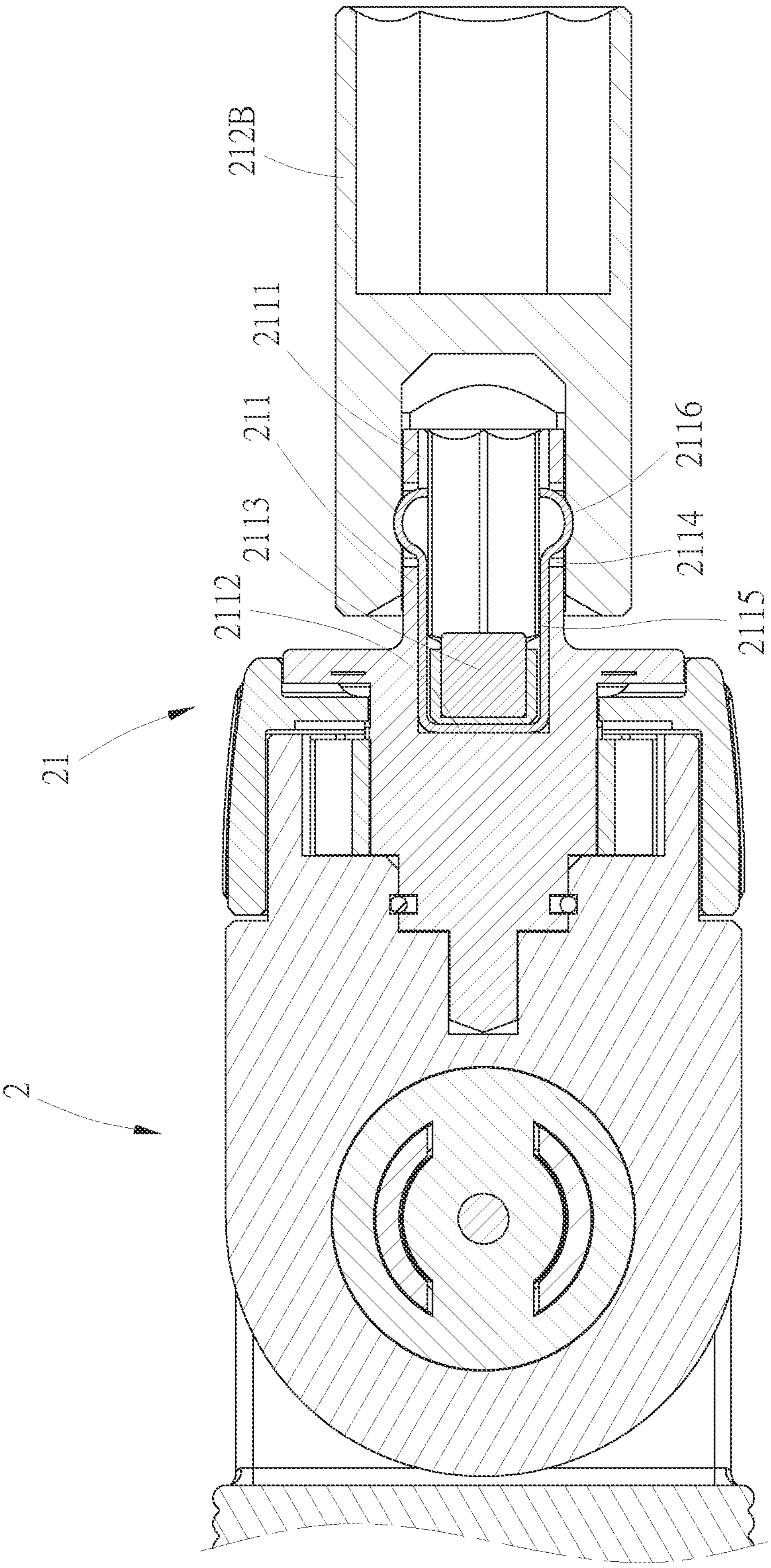
FIG. 9 is a cross-sectional view of the tool part equipped with a socket of the tool head of the present invention.

Referring to FIG. 7, FIG. 8 and FIG. 9, in the rotatable hand tool of this embodiment, the tool part 21 of the tool head 2 includes a connector 211 and a replaceable driver bit. The replaceable driver bit is detachably connected to the connector 211. Specifically, the connector 211 has a receiving groove 2111, a U-shaped elastic plate 2112, and a magnetic member 2113. Two opposite side walls of the receiving groove 2111 have a pair of coupling holes 2114. The U-shaped clastic plate 2112 includes two elastic legs 2115 each having a curved protruding portion 2116. The U-shaped elastic plate 2112 is inserted into the receiving groove 2111 and the arc-shaped protruding portions 2116 of the two elastic legs 2115 extend out of the coupling holes 2114. The magnetic member 2113 is placed in the receiving groove 2111. The replaceable driver bit may include a driver 212A and a socket 212B. When the driver 212A is to be used, the driver 212A is inserted in the receiving groove 2111 and attracted and secured by the magnetic member 2113. When the socket 212B is to be used, the socket 212B is sleeved on the connector 211 and elastically secured by the curved protruding portions 2116 of the two elastic legs 2115 of the U-shaped elastic plate 2112.

Referring to FIG. 7 through FIG. 10, in the rotatable hand tool of this embodiment, the tool part 21 of the tool head 2 has a ratchet structure, specifically including a ratchet body seat 213, a ratchet elastic plate 214, two detents 215, a pinion 216, a positioning clastic plate 217, a ratchet direction adjustment member 218, and a rotary cap 219. The ratchet body seat 213 has an accommodating space 2131. A first restricting portion 2132, a second restricting portion 2133 and two spaced blocking portions 2134 are provided on the inner wall of the accommodating space 2131. The ratchet clastic plate 214 is disposed on the first restricting portion 2132 of the accommodating space 2131. The ratchet elastic plate 214 has two holding portions 2141 corresponding to the two blocking portions 2134. In this embodiment, the first restricting portion 2132 includes a first concave space 2135 and two engaging blocks 2136 adjacent to two side walls of the first concave space 2135. The ratchet elastic plate 214 has two engaging grooves 2142 corresponding to the two engaging blocks 2136, thereby retaining the ratchet elastic plate 214 on the first restricting portion 2132. The two detents 215 are disposed in the accommodating space 2131. One side of each detent 215 is blocked by a corresponding one of the blocking portions 2134. The other side of each detent 215 is held by a corresponding one of the holding portions 2141 of the ratchet clastic plate 214, so that each detent 215 is positioned between the corresponding blocking portion 2134 and the corresponding holding portion 2141. One end of the pinion 216 is connected to the connector 211, and the other end of the pinion 216 is inserted into the accommodating space 2131. A first toothed portion 2161 of the pinion 216 is located between the two detents 215. The first toothed portion 2161 is detachably engaged with a second toothed portion 2151 of each detent 215. The positioning elastic plate 217 is disposed on the second restricting portion 2133 of the accommodating space 2131. The second restricting portion 2133 includes a second concave space 2137 and two blocking walls 2138 adjacent to the second concave space 2137. The positioning elastic plate 217 is placed in the second concave space 2137. Two ends of the positioning clastic plate 217 are held by the two blocking walls 2138. The positioning elastic plate 217 has an operating portion 2171. In this embodiment, the operating portion 2171 is in the form of a protrusion. The ratchet direction adjustment member 218 is coupled to the rotary cap 219. The ratchet direction adjustment member 218 has two contact portions 2181 corresponding to the respective detents 215. The ratchet direction adjustment member 218 has an operated portion 2182 corresponding to the operating portion 2171 of the positioning elastic plate 217. In this embodiment, the operated portion 2182 is in the form of three notches that are arranged side by side and correspond to the operating portion 2171. The rotary cap 219 covers the ratchet body seat 213. The pinion 216 passes through the rotary cap 219 and is inserted into the accommodating space 2131.

Figure 10:
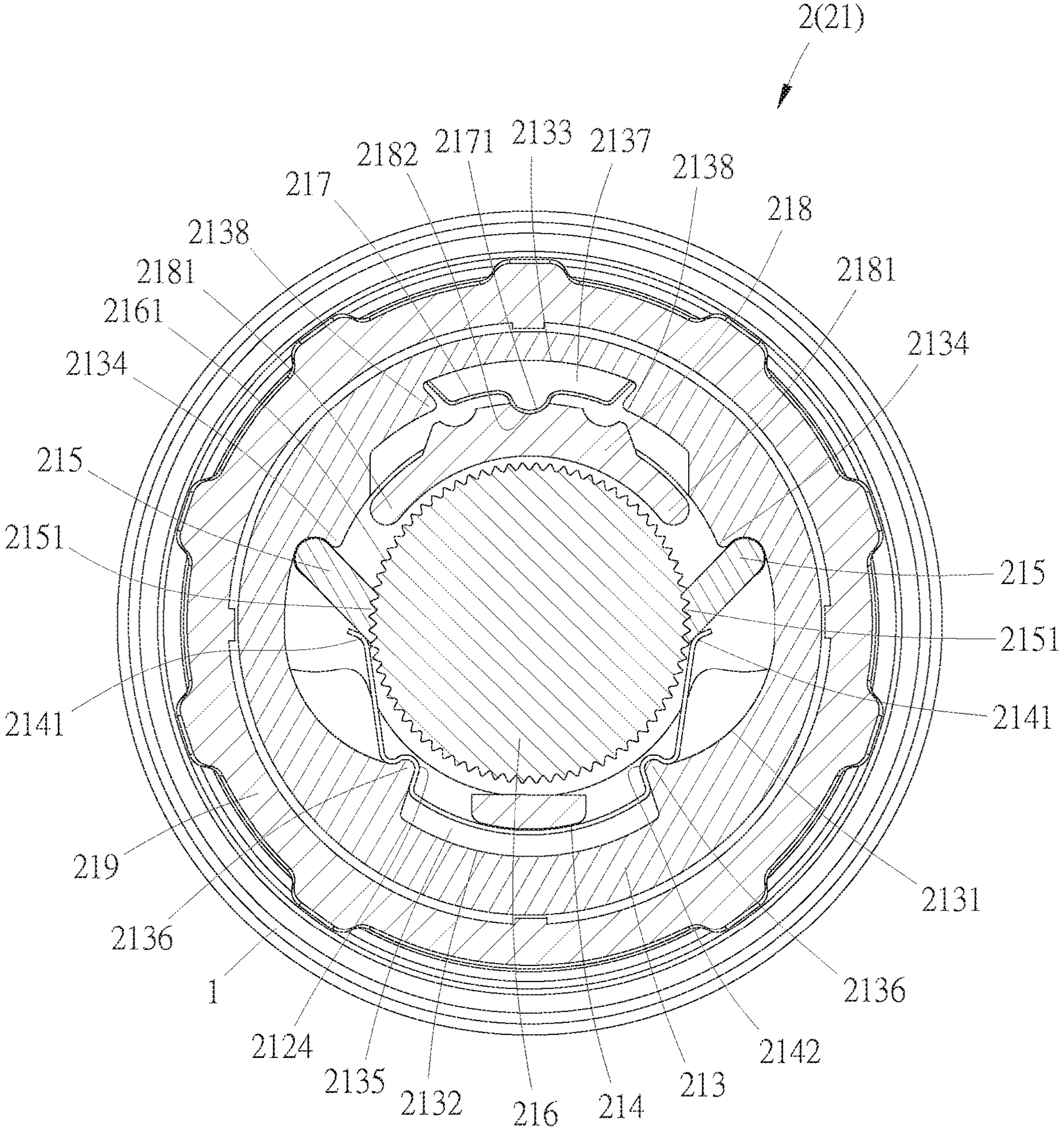
FIG. 10 is a cross-sectional view of the ratchet structure of the tool part of FIG. 7.

Referring to FIG. 10, when the operating portion 2171 is in the middle notch of the operated portion 2182, the two contact portions 2181 of the ratchet direction adjustment member 218 are not in contact with the two detents 215, such that the two detents 215 are engaged with the pinion 216 so the pinion 216 is unable to rotate. Therefore, the tool part 21 of the tool head 2 can be operated in both clockwise and counterclockwise directions.

Figure 11:
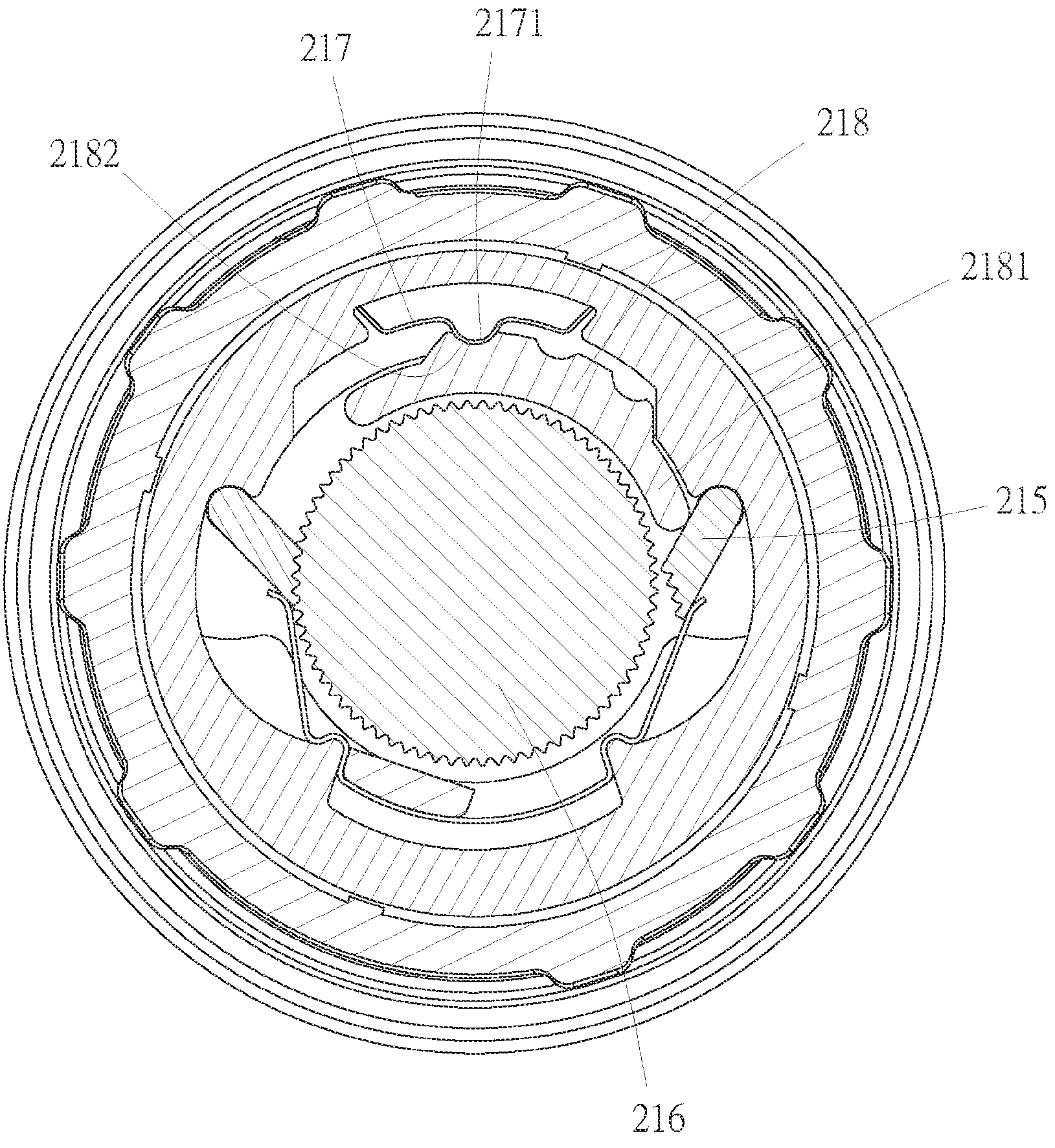
FIG. 11 is a schematic view of FIG. 10, illustrating that the tool part of the tool head is idling in the clockwise direction.
Figure 12:
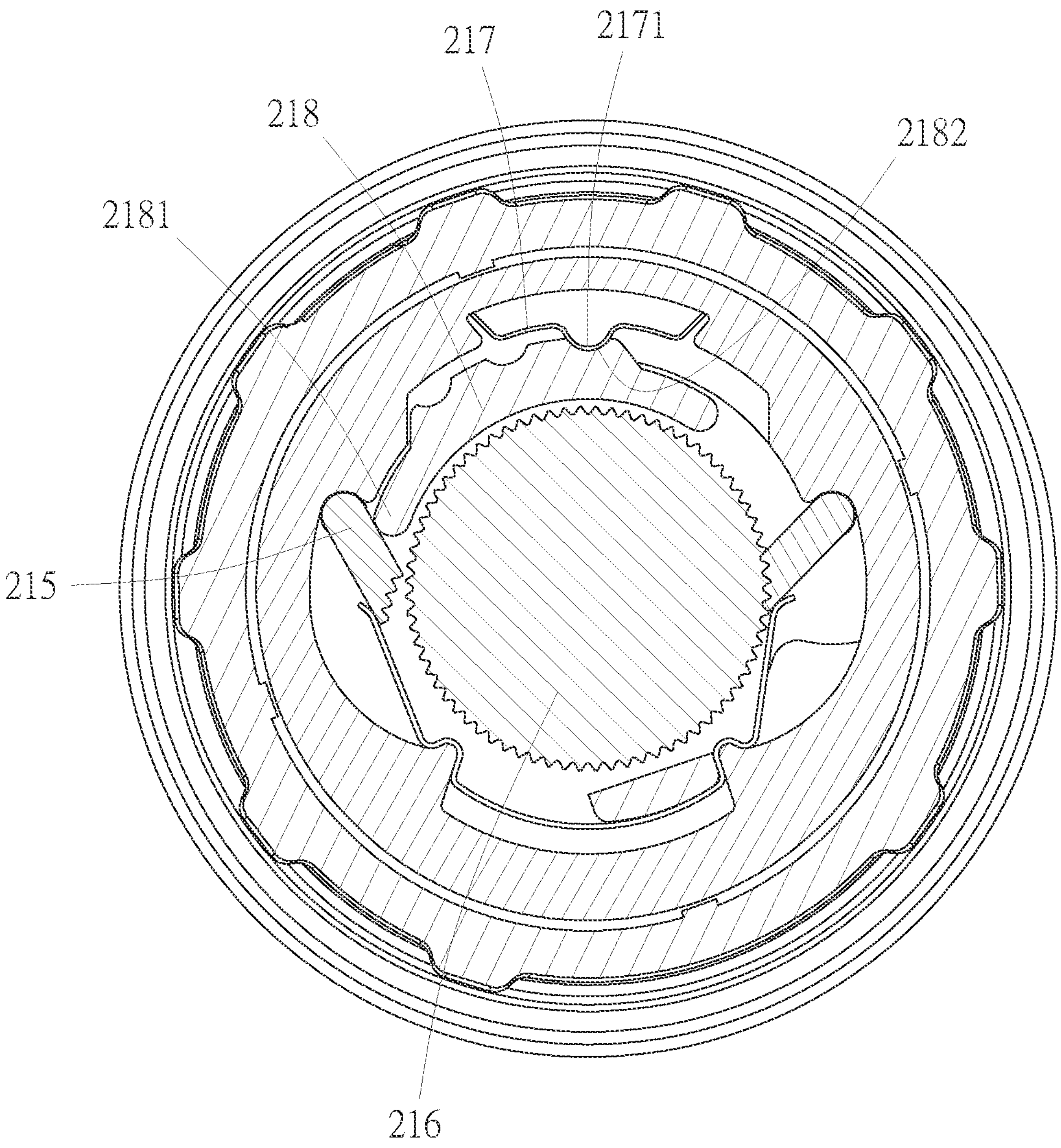
FIG. 12 is a schematic view of FIG. 10, illustrating that the tool part of the tool head is idling in the counterclockwise direction.

Referring to FIG. 11 and FIG. 12, when in use, according to the direction of the bolt or other similar workpieces to be rotated, the operated portion 2182 of the ratchet direction adjustment member 218 is driven by the operating portion 2171 of the positioning elastic plate 217 for one of the contact portions 2181 to be in contact with the corresponding detent 215, and then the corresponding detent 215 is pushed by the contact portion 2181 to separate from the pinion 216, so as to adjust the rotation direction of the pinion 216. For example, as shown in FIG. 11, the operating portion 2171 is moved to be engaged in the notch on the left side of the operated portion 2182. At this time, the right side of the pinion 216 is not constrained, so the pinion 216 is idling clockwise. As shown in FIG. 12, the operating portion 2171 is moved to be engaged in the notch on the right side of the operated portion 2182. At this time, the left side of the pinion 216 is not constrained, so the pinion 216 is idling counterclockwise.

Figure 13:
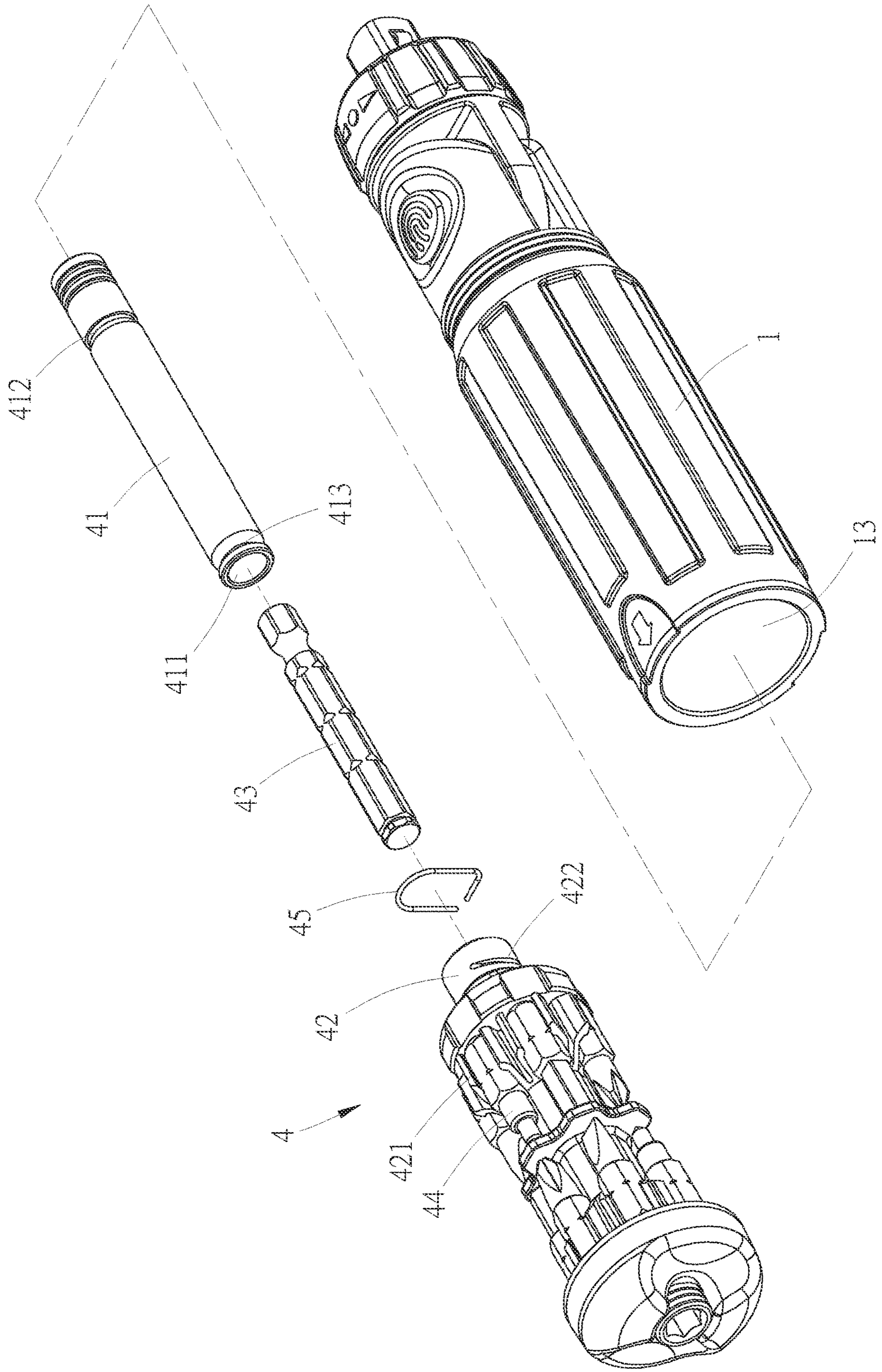
FIG. 13 is an exploded view of the driver bit storage unit at the other end of the grip of the present invention.
Figure 14:
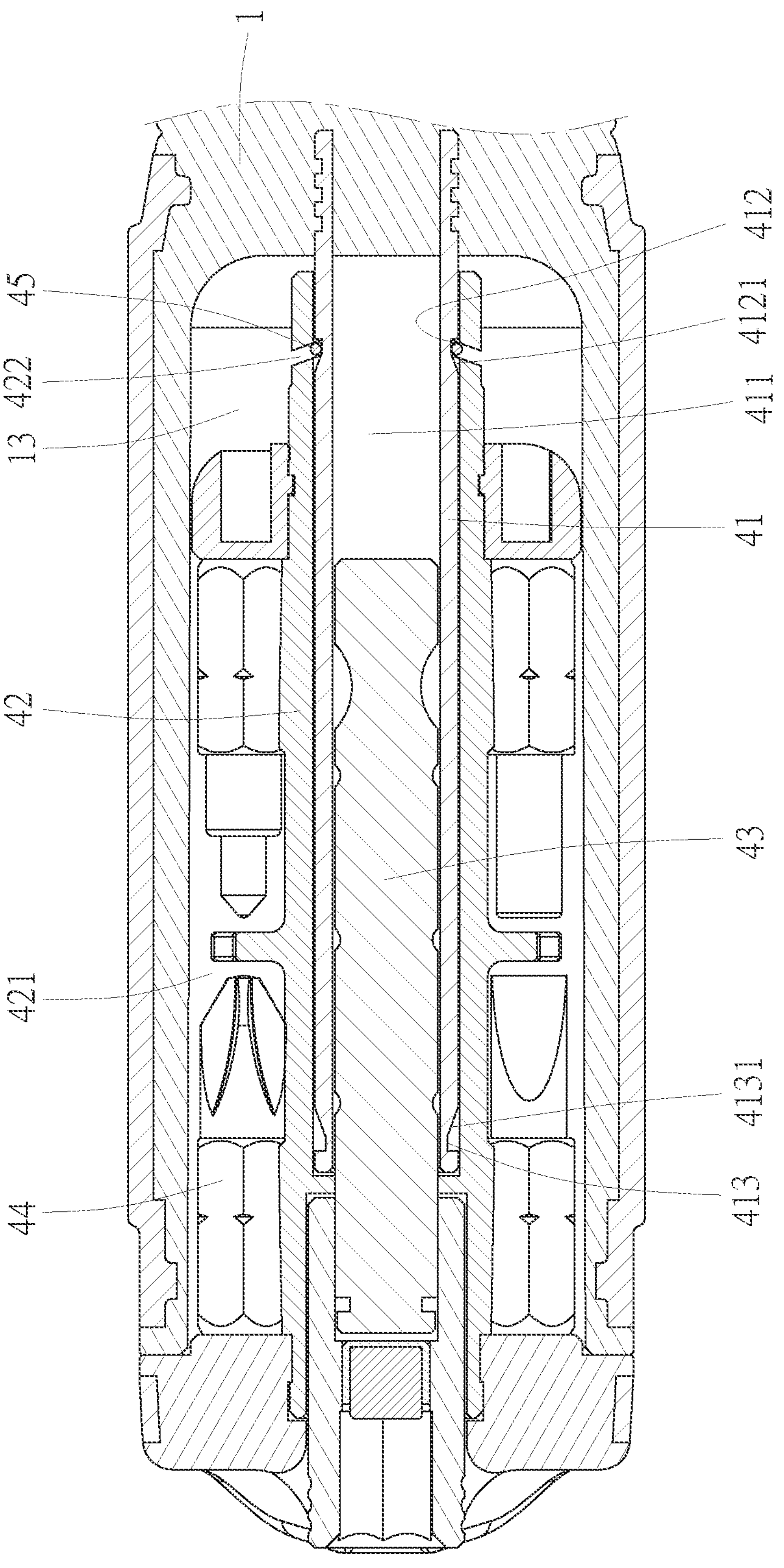
FIG. 14 is a cross-sectional view of FIG. 13.
Figure 15:
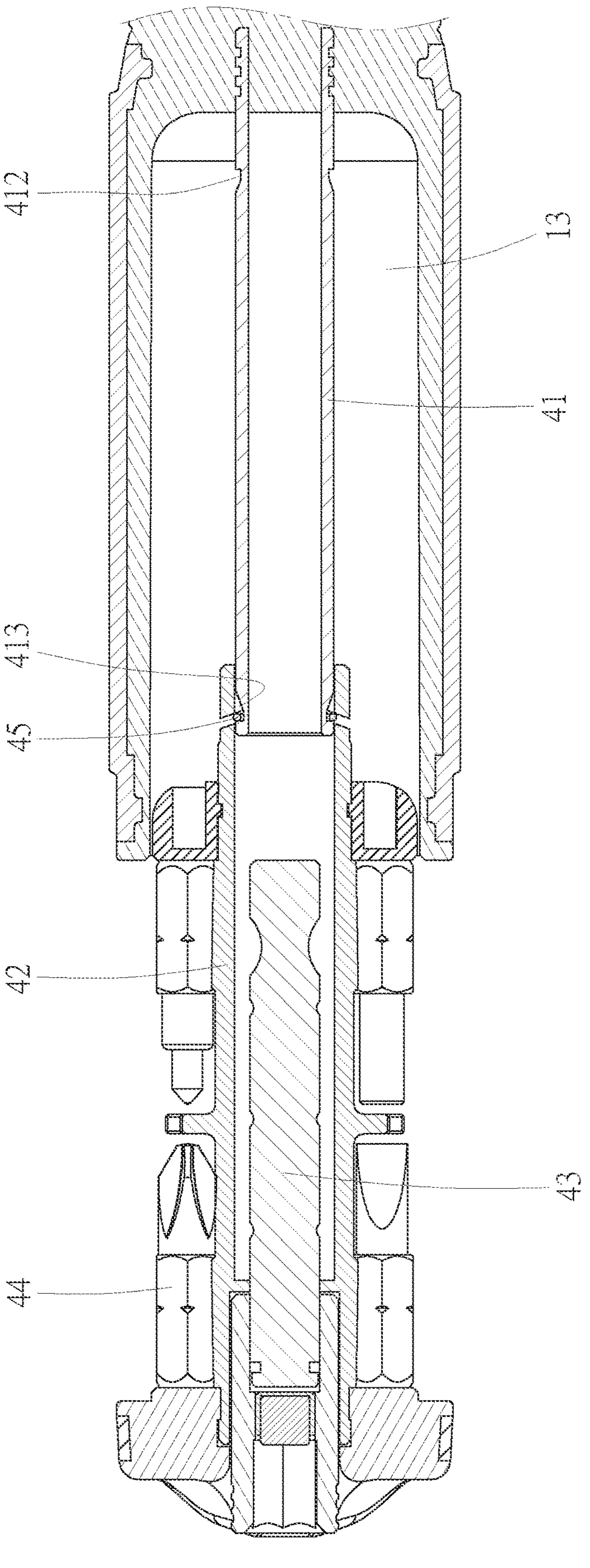
FIG. 15 is a schematic view of FIG. 13, illustrating that the storage rod of the driver bit storage unit slides on the slide rod out of the accommodating groove.
Figure 16:
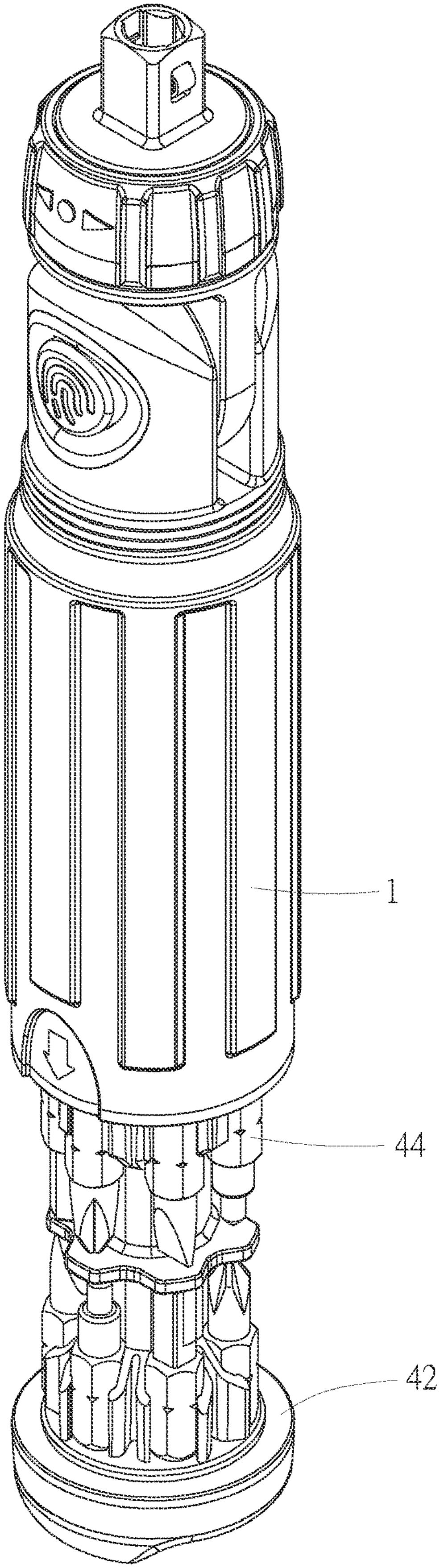
FIG. 16 is a perspective view of FIG. 13, illustrating that the storage rod of the driver bit storage unit slides on the slide rod out of the accommodating groove.

Referring to FIG. 13, FIG. 14, and FIG. 15, in the rotatable hand tool of this embodiment, the other end of the grip 1 is recessed to form an accommodating groove 13. A driver bit storage unit 4 is accommodated in the accommodating groove 13. The driver bit storage unit 4 includes a slide rod 41 and a storage rod 42. The slide rod 41 is secured in the accommodating groove 13. The slide rod 41 is hollow inside to form a hollow portion 411. An extension rod 43 is placed in the hollow portion 411. The storage rod 42 has a plurality of grooves 421 formed on its peripheral wall. A plurality of replaceable driver bits 44 are respectively received in the grooves 421. The storage rod 42 is sleeved on the slide rod 41 and is slidable along the slide rod 41, thereby allowing the storage rod 42 to slide into or out of the accommodating groove 13. Specifically, the slide rod 41 has an annular first restricting groove 412 and an annular second restricting groove 413 on two opposite ends, respectively. The first restricting groove 412 is adjacent to the inner edge of the accommodating groove 13. The second restricting groove 413 is adjacent to the opening of the accommodating groove 13. The first restricting groove 412 has a first slope 4121 extending obliquely from the bottom of the first restricting groove 412 toward the second restricting groove 413. The second restricting groove 413 has a second slope 4131 extending obliquely from the bottom of the second restricting groove 413 toward the first restricting groove 412. The storage rod 42 has an arc-shaped slot 422. A fastener 45 is inserted in the arc-shaped slot 422 from the outside of the storage rod 42. When the storage rod 42 slides on the slide rod 41 into or out of the accommodating groove 13, the fastener 45 is selectively restricted in the first restricting groove 412 or in the second restricting groove 413. Thus, as shown in FIG. 16, the replaceable driver bits 44 can be stored and replaced conveniently, and the extension rod 43 may be used when the desired operating distance is longer.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A rotatable hand tool, comprising:

a grip extending in an axial direction, one end of the grip having a first pivot portion, the first pivot portion having a recess and a first tooth groove, the recess extending in a radial direction perpendicular to the axial direction, the first tooth groove communicating with the recess;

a tool head releasably coupled to said first pivot portion of said grip, said tool head having a tool part at one end thereof in the axial direction and a second pivot portion at another end thereof, the second pivot portion having a through hole in the radial direction and a second tooth groove communicating with the through hole;

a pivoting unit releasably connecting the first pivot portion of the grip and the second pivot portion of the tool head, so that the tool head is pivotally connected to the grip, the pivoting unit including an elastic member, a positioning gear and a button assembly, the elastic member being placed into the recess, the positioning gear leaning against the elastic member and being engaged with the first tooth groove and the second tooth groove so that the tool head is retained at an initial angle relative to the grip, the button assembly being inserted in the through hole and corresponding to the positioning gear, the button assembly being movable in the radial direction when being pressed;

wherein, when the button assembly is pressed, the button assembly pushes against the positioning gear for controlling the positioning gear to disengage from the second tooth groove and compress the elastic member, such that the tool head can be operated to pivot to a working angle relative to the grip, after that, the button assembly is released to return the elastic member and control the positioning gear to be engaged with the second tooth groove again so that the tool head is retained at the working angle relative to the grip, and wherein the button assembly includes a button and a retaining base configured with an opening, a bottom located opposite to said opening, and a perforation extending through said bottom of the retaining base, wherein the button has a pressing piece facing the opening of said retaining base, wherein the button is disposed to enter in the retaining base through said opening, and wherein the pressing piece passes through the perforation extending through the bottom of the retaining base to push against the positioning gear.

2. The rotatable hand tool as claimed in claim 1, wherein the button assembly further includes a retaining pin, wherein the grip has a retaining portion configured with a retaining hole, and wherein the retaining base passes through the retaining hole and is inserted in the through hole to lean against the positioning gear, the retaining pin passes through the retaining base to lock the retaining base on the grip.

3. The rotatable hand tool as claimed in claim 1, wherein the tool part of the tool head includes a connector configured for detachable coupling with a replaceable driver bit, wherein the replaceable driver bit is selected from a group consisting of a driver and a socket.

4. The rotatable hand tool as claimed in claim 3, wherein the connector has a receiving groove, a U-shaped elastic plate and a magnetic member, two opposite side walls of the receiving groove have a pair of coupling holes, the U-shaped elastic plate includes two elastic legs each having a curved protruding portion, the U-shaped elastic plate is inserted into the receiving groove and the curved protruding portions of the two elastic legs extend out of the coupling holes, the magnetic member is placed in the receiving groove; wherein, for the detachable coupling of the driver of the replaceable driver to the connector, the driver of the replaceable driver is inserted in the receiving groove and attracted and secured by the magnetic member, and wherein, for the detachable coupling of the socket of the replaceable driver to the connector, the socket of the replaceable driver is sleeved on the connector and elastically secured by the curved protruding portions of the two elastic legs of the U-shaped elastic plate.

5. The rotatable hand tool as claimed in claim 3, wherein the tool part of the tool head includes a ratchet body seat, a ratchet elastic plate, two detents, a pinion, a positioning elastic plate and a ratchet direction adjustment member; the ratchet body seat has an accommodating space, a first restricting portion, a second restricting portion and two spaced blocking portions are provided on an inner wall of the accommodating space; the ratchet elastic plate is disposed on the first restricting portion of the accommodating space, the ratchet elastic plate has two holding portions corresponding to the two blocking portions; the two detents are disposed in the accommodating space, one side of each detent is blocked by a corresponding one of the blocking portions, and another side of each detent is held by a corresponding one of the holding portions of the ratchet elastic plate, so that each detent is positioned between the corresponding blocking portion and the corresponding holding portion; one end of the pinion is connected to the connector, another end of the pinion is inserted into the accommodating space, a first toothed portion of the pinion is located between the two detents, the first toothed portion is detachably engaged with a second toothed portion of each detent; the positioning elastic plate is disposed on the second restricting portion of the accommodating space, the positioning elastic plate has an operating portion; the ratchet direction adjustment member has two contact portions corresponding to the respective detents, the ratchet direction adjustment member has an operated portion corresponding to the operating portion of the positioning elastic plate; the operating portion is configured to operate the operated portion for one of the contact portions to push against a corresponding one of the detents, so that the second toothed portion of the corresponding detent is disengaged from the first toothed portion of the pinion.

6. The rotatable hand tool as claimed in claim 5, wherein the first restricting portion includes a first concave space and two engaging blocks adjacent to two side walls of the first concave space, and the ratchet elastic plate has two engaging grooves corresponding to the two engaging blocks, thereby retaining the ratchet elastic plate on the first restricting portion.

7. The rotatable hand tool as claimed in claim 5, wherein the second restricting portion includes a second concave space and two blocking walls adjacent to the second concave space, the positioning elastic plate is placed in the second concave space, and two ends of the positioning elastic plate are held by the two blocking walls.

8. The rotatable hand tool as claimed in claim 5, wherein the operating portion of the positioning elastic plate is in the form of a protrusion, and the operated portion of the ratchet direction adjustment member is in the form of three notches that are arranged side by side.

9. The rotatable hand tool as claimed in claim 5, wherein a rotary cap is provided to cover the ratchet body seat, the pinion passes through the rotary cap, and the ratchet direction adjustment member is coupled to the rotary cap.

10. The rotatable hand tool as claimed in claim 1, wherein another end of the grip is recessed to form an accommodating groove, a driver bit storage unit is accommodated in the accommodating groove, the driver bit storage unit includes a slide rod and a storage rod, the slide rod is secured in the accommodating groove, the storage rod has a plurality of grooves formed on a peripheral wall thereof, a plurality of replaceable driver bits are received in the respective grooves, the storage rod is sleeved on the slide rod and is slidable along the slide rod, thereby allowing the storage rod to slide into or out of the accommodating groove.

11. The rotatable hand tool as claimed in claim 10, wherein the slide rod has an annular first restricting groove and an annular second restricting groove on two opposite ends thereof, the first restricting groove is adjacent to an inner edge of the accommodating groove, the second restricting groove is adjacent to an opening of the accommodating groove, the first restricting groove has a first slope extending obliquely from a bottom of the first restricting groove toward the second restricting groove, the second restricting groove has a second slope extending obliquely from a bottom of the second restricting groove toward the first restricting groove, the storage rod has an arc-shaped slot, a fastener is inserted in the arc-shaped slot from an outside of the storage rod, when the storage rod slides on the slide rod into or out of the accommodating groove, the fastener is selectively restricted in the first restricting groove or in the second restricting groove.

* * * * *